United States Patent [19]
Hsieh

[11] Patent Number: 5,461,422
[45] Date of Patent: Oct. 24, 1995

[54] QUANTIZER WITH AUTOMATIC PRE-THRESHOLD

[75] Inventor: Hsun-Chang Hsieh, Hsinchu, Taiwan

[73] Assignee: Industrial Technology Research Institute, Hsinchu, Taiwan

[21] Appl. No.: 248,070

[22] Filed: May 23, 1994

[51] Int. Cl.$^6$ ..................................... H04N 7/50
[52] U.S. Cl. ................. 348/405; 348/419; 358/261.1
[58] Field of Search ...................... 348/405, 419; 382/56; 358/261.1; H04N 7/133

[56] References Cited

U.S. PATENT DOCUMENTS 5,056,154  10/1991  Aono .......................................... 382/56
5,072,302  12/1991  Ronchetti ............................... 358/261.1

Primary Examiner—Howard W. Britton
Attorney, Agent, or Firm—Meltzer, Lippe, Goldstein et al.

[57] ABSTRACT

An improved video encoder performs quantization after run length conversion. This is in contrast to the conventional encoder wherein quanization takes place before run-level conversion. The inventive encoder design provides a unique look forward process for controlling the number of run-level pairs and thus the number of coded bits. In addition, the stringent speed requirements on the quantizer are reduced because only run-level pairs rather than all DCT coefficients are quantized.

16 Claims, 6 Drawing Sheets

FIG. 2
(PRIOR ART)

QUANTIZER WITH AUTOMATIC PRE-THRESHOLD

FIELD OF THE INVENTION

The present invention is directed to a video encoder such as an H.261 video encoder.

In conventional video encoders, dynamic quantization is done before run-level conversion. In contrast, in the present invention, quantization takes place after run-level conversion.

BACKGROUND OF THE INVENTION

Video and image compression are essential technologies in a video oriented world. The need for video compression occurs in a wide range of applications to reduce the bandwidth required to transmit video and to reduce the amount of storage capacity required to store video.

Several standard compression algorithms have been proposed. The Joint Photographic Experts Group (JPEG) standard specifies a method for compressing images. The primary mechanisms of compression are frequency dependent quantization of DCT coefficients, and the subsequent Huffman coding of non-zero quantized coefficients. The CCITT H.261 standard proposed for video telephony is similar to JPEG in that DCT coefficients are quantized and coded with a Huffman coding algorithm. The primary difference between JPEG and H.261 is the use of motion compensation temporal prediction. Essentially, instead of coding the image, temporal prediction errors are coded. For video storage, the Motion Picture Expert's Group (MPEG) standard has been proposed. MPEG and H.261 are similar and MPEG provides greater flexibility and the ability to achieve greater compression with the same quality. The present invention is applicable to encoders using all of these standards. For purposes of clarity, the invention will be explained with reference to an H.261 encoder.

The H.261 encoder produces a bit stream at px64K bits/sec. As indicated above, the H.261 encoder uses a hybrid video compression technique including predictive coding, transform coding, and entropy coding to reduce the output data rate. The H.261 encoder is required to output a bit stream at a constant rate for real time communication applications.

The H.261 encoder performs operations on blocks or macroblocks of pixels. Each block is 8×8 pixels and each macroblock comprises four luminance blocks and two chrominance blocks.

The H.261 encoder has two modes of operation. The intraframe mode realizes compression within one frame in the spatial dimension only. Compression in the temporal direction is disabled. This mode is used for coding the first frame in a scene and for resetting the prediction loop. The interframe mode, in addition to compression within one frame, also realizes compression between consecutive frames. The previous frame is motion compensated and then used as a prediction for the current frame.

A conventional H.261 encoder 10 is illustrated in FIG. 1. A frame of video to be encoded is stored in the input frame buffer 12. If the frame is an intraframe, coding is as follows. Each block in the frame buffer 12 is transmitted to the Discrete Cosine Transform (DCT) circuit 14 (no subtraction takes place in the subtractor 16 as the input to the subtractor 16 on line 17 is zero when intramode coding is used). The DCT coefficients outputted by the DCT circuit 14 are then quantized by the quantizer 18. The block of quantized transform coefficients outputted by the quantizer 18 is then zig-zag scanned using the scanning pattern shown in FIG. 2. The quantized transform coefficients then undergo run-level conversion using the run-level converter 20. The resulting run-level pairs are then coded by the variable length coder 22 and stored in the output buffer 24.

The output buffer 24 is used because the bit rate output of the variable length coder 22 is inherently variable. Using a control mechanism described below, the output buffer outputs a constant rate bit stream on the channel 26 for real time communications.

The quantization step size of the quantizer 18 is the same for all transform coefficients in a macroblock. However, the quantization step size can be changed from one macroblock to the next. The quantization step size is normally controlled by the amount of space left in the output buffer 24. The output buffer controller 28 senses the amount of space left in the buffer 24 and sends a feedback signal to the quantizer 18 (as well as the inverse quantizer 30) to control the step size. When the buffer 24 has excess capacity, the quantization step size can be decreased in order to increase the amount of code bits to obtain a better quality reconstructed image.

On the other hand, when the buffer 24 is nearly full, the quantization step size can be increased to reduce the amount of code bits at the expense of picture quality.

When the frame to be coded is an interframe, coding proceeds as follows. For each macroblock in the interframe, a decision is made whether to perform intra or intermode processing. The decision is made by the inter/intra decision circuit 40. The decision to perform inter or intra mode processing for a macroblock is made on the basis of the energies of the luminance prediction error and the original luminance signal. The original luminance signal is transmitted to the decision circuit 40 from the input frame 12. The luminance prediction is transmitted to the decision circuit from the loop filter 42. In general, intramode coding is used if the original luminance signal has less AC energy than the luminance prediction error has total energy. However, if the prediction error has sufficiently small energy, then intermode coding is used for the macroblock. If the decision circuit 40 decides to use intramode processing for a macroblock, the multiplexer 44 outputs a zero to the input 17 of subtractor 16 and the coding proceeds as described above for a block of an intraframe (i.e., DCT, quantization, run-level conversion, variable length coding). If the decision circuit 40 decides to use intermode processing, a prediction is outputted by the multiplexer 44 to the input 17 of the subtractor. The prediction is subtracted from the original signal using the subtractor 17 and the residues are then coded using DCT circuit 14, quantizer 18, run-level converter 20, and variable length coder 22. The coded residue transform coefficients are stored in the output buffer 24 whose contents is used to control the quantization step size using the feedback mechanism described above.

The prediction used for the inter/intra decision and for intermode coding is a motion compensated prediction. This prediction is obtained as follows. The previous frame is stored in the previous frame memory 50. The motion estimation circuit 52 receives a block of pixels of the current frame from the input buffer 12. The motion estimation circuit 52 also receives a corresponding search area in the previous frame from the previous frame memory 50. The displacement of the current block in the search area which results in the best match is outputted by the motion estimation circuit as the motion vector. When intermode coding is used, the motion vector is transmitted to the variable length coder 22 for coding and transmission via the channel 26.

The motion vector is also transmitted to the motion compensation circuit 54 which accesses from the frame memory a motion compensated prediction for the current block. The loop filter 42, which also receives the motion vector, removes artifacts associated with the motion compensation.

The encoder 10 of FIG. 1 includes a decoder 31 for generating the pixel values stored in the previous frame memory 50. The decoder 31 includes the inverse quantizer circuit 30 and the inverse DCT circuit 31. When intramode processing is used, the quantized transform coefficients generated by the quantizer 18 are inverse quantized by the inverse quantizer 30. Then the Inverse Discrete Cosine Transform circuit 32 is used to reconstruct the original pixel values. When intramode processing is used, the multiplexer 44 outputs a zero so there is a zero at the input 33 of the adder 34. Thus, the reconstructed original pixel values are transferred directly to the previous frame memory 50. When intermode processing is used, the quantized residual transform coefficients outputted by the quantizer 18 are processed by the inverse quantizer 30 and the inverse DCT circuit 32 to generate reconstructed residual pixel values. The reconstructed residual pixel values are added to the motion compensated prediction using adder 33 to obtain reconstructed original pixel values which are stored in the previous frame memory 50. The loop delay 34 is provided to compensate for the delays of the coding/decoding loop.

The H.261 decoder is described in detail in Ruetz et al "High-Performance Full-Motion Video Compression Chip Set", IEEE Trans. on Circuits and Systems for Video Technology, Vol. 2, No. 2, June 1992, pp 111–121; Fujiwara et all "An All-ASIC Implementation of a Low Bit Rate Video Codec" IEEE trans on Circuits and Systems for Video Technology, Vol. 2, NO. 2, pp 123–133; and CCITT Video Compression Chipset Technical Note, LSI Logic Corporation 1991. The contents of these references are incorporated herein by reference.

In the H.261 encoder discussed above, run-level conversion is performed after quantization. The predictive residual data or original pixel data is first transformed by the DCT circuit and the DCT coefficients are quantized by a quantizer which is dynamic. That is, the quantization step size of the quantizer 18 (and inverse quantizer 30) is dynamically controlled by the output buffer controller 28. The output buffer controller 18 updates the quantization step according to the status of the output buffer. Thus, there is a feedback loop for dynamic quantization and output buffer control.

However, this feedback mechanism exhibits certain disadvantages. First, there is a latency in the adaptation of the quantization step size due to the feedback loop. The buffer status is only known with the delay of the run-level conversion and variable length coding. Thus, a more accurate buffer control mechanism should estimate the future buffer status rather than obtain the current buffer status.

In addition, most of the quantization is redundant. As the output rate of the H.261 encoder is limited by the communication channel, most of the DCT coefficients need not be transmitted and will be abandoned. However, the quantization is accomplished in advance so that each of the DCT coefficients is quantized no matter what the buffer status is. Most of these quantized coefficients are redundant and not transmitted at all.

Specifically, a typical image sequence in QCIF comprising 30 frames was encoded using a simulation of the encoder of FIG. 1 to achieve an output bit rate of 384 kbps. In the 30 frames, there are totally 17820 blocks. The busiest block has 21 run-level pairs. Moreover, there are 7905 blocks without any run-level pairs generated. Thus, nearly forty-two percent of the blocks need not be quantized at all. There are a total of only 40429 run-level pairs for the 17820 blocks, an average of about 2.27 run-level pairs per block. Each block has 64 DCT coefficients, but only 2-3 coefficients on average really need to be quantized. Thus, the quantization of 61-62 coefficients per block will be redundant if the quantization is done before run-level conversion. This is about 95% redundancy.

Moreover, the conventional encoder, such as the H.261 encoder of FIG. 1, usually requires separate hardware for the quantizer 18 and inverse quantizer 30. Because every DCT coefficient is quantized and inverse quantized, these circuits must operate at the pixel rate so that speed becomes critical. For example, 30 frames/second CIF format video requires 4.56M quantization operations per second.

Accordingly, it is an object of the invention to provide an encoder which overcomes the shortcomings of the conventional (e.g. H.261) encoder. Specifically, it is an object of the invention to provide an encoder which eliminates or reduces the need for the feedback loop used to control the quantization step size. It is also an object of the invention to provide an encoder which eliminates the redundant quantization, thereby reducing the speed requirements on the quantizer and inverse quantizer, and thereby permitting a software implementation.

SUMMARY OF THE INVENTION

In accordance with the present invention, in an encoder for encoding a video image, a sequence of tranform coefficients is generated for each block of the video image to be coded. The transform coefficients are then converted into run-level pairs. The run-level pairs are then quantized by quantizing the level value in each run-level pair. The quantized run-level pairs are then variable length coded and transferred to an output buffer. This is in contrast to the conventional video encoder, which, as described above, quantizes the transform coefficients before run-level conversion. The inventive encoder is advantageous in comparison to the prior art because relatively few run-level pairs are quantized rather than a large number of transform coefficients. This reduces the stringent requirements on quantizer performance and permits a software implementation.

In addition, a look forward algorithm may be used to control the rate at which bits are delivered to the output buffer. This is accomplished by controlling the number of run-level pairs which are generated. To generate the run-level pairs for a block of an image, the absolute value of each transform coefficient is first compared to a threshold. A transform coefficient whose absolute value is below the threshold is outputted as a zero. The value of any transform coefficient whose absolute value is above the threshold is latched in a register. A counter counts the run of zero's before each transform coefficient that is latched in the register and when a transform coefficient is finally latched in the register, the counter and register outputs form a run-level pair. The number of run-level pairs which are generated for each block of the image (and thus the number of bits delivered to the output buffer) may be controlled by controlling the threshold value. Increasing the threshold value decreases the number of run-level pairs generated for a block of an image. Decreasing the threshold value increases the number of run-level pairs that are generated for a block of the image.

In accordance with the present invention, the threshold is varied dynamically. The accumulated total of run-level pairs generated for all the previously encoded blocks in an image is compared with a reference count. The reference count is incremented by a fixed number for each succeeding block in the image. The fixed number is equal to a predetermined desired average number of run-level pairs per block. If the accumulated total of run-level pairs exceeds the reference count, the threshold is increased to decrease the number of run-level pairs generated for the next block of the image. If the accumulated total of run-level pairs is less than the reference count, the threshold is decreased and the number of run-level pairs generated for the next block of the image is increased. In this manner, the number of run-level pairs is carefully controlled and so is the number of bits transferred into the output buffer.

BRIEF DESCRIPTION OF THE DRAWING

FIG. 2 illustrates a zig-zag scanning pattern used in the H.261 encoder of FIG. 1.

DETAILED DESCRIPTION OF THE INVENTION

Figure 3:
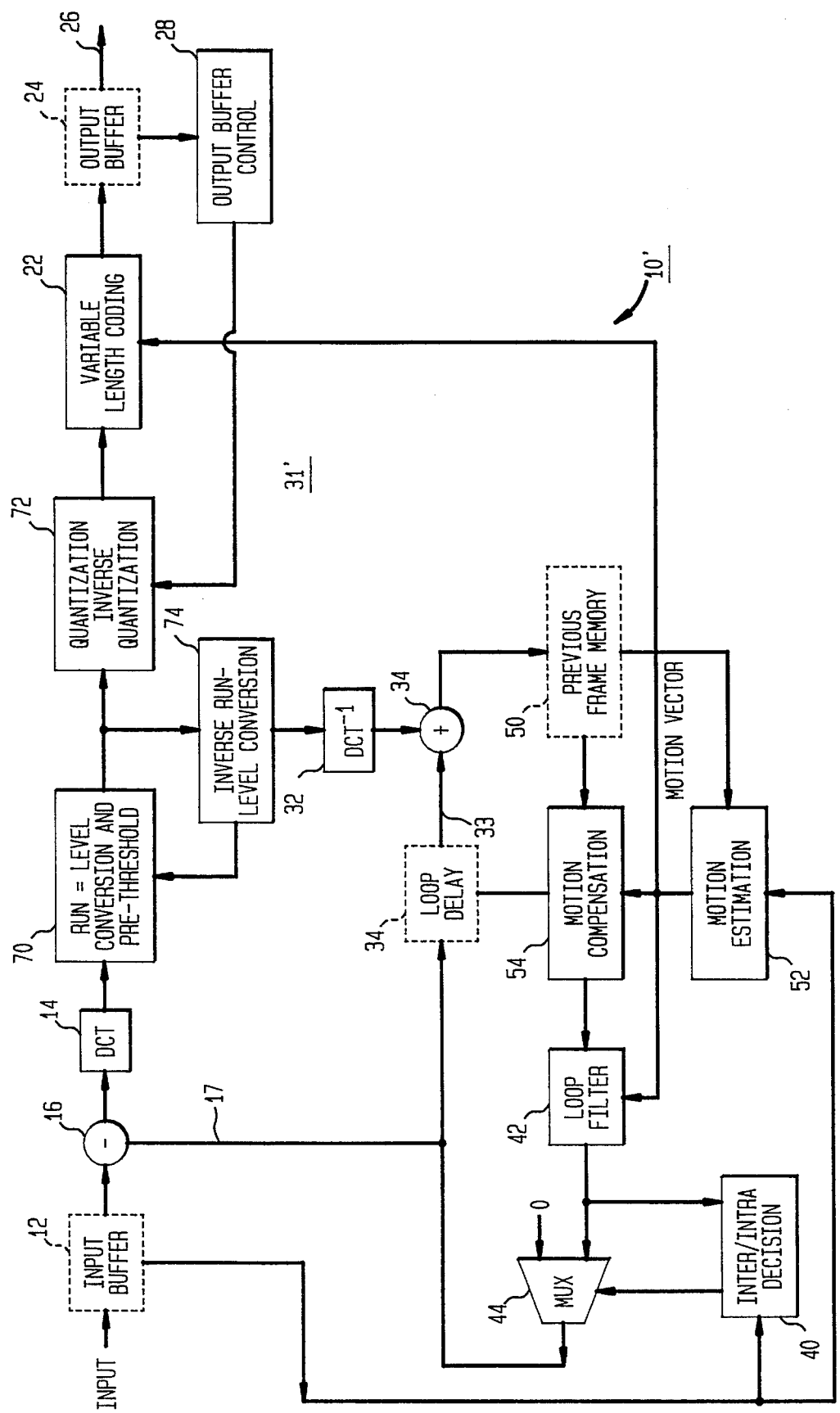
FIG. 3 illustrates a video encoder in accordance with an embodiment of the present invention.

FIG. 3 illustrates a video encoder 10' in accordance with an illustrative embodiment of the invention. The encoder 10' of FIG. 3 differs from the conventional encoder 10 of FIG. 1 in that the quantizer 18, run-level converter 20 and inverse quantizer 30 are eliminated.

Instead, the encoder 10' of FIG. 3 includes the run-level converter circuit 70 for performing run-level conversion directly on DCT coefficients, a circuit 72 for quantizing the run-level pairs produced by the run-level converter 70 and for inverse quantizing these run-level pairs, and an inverse run-level converter 74.

The inverse quantizer and inverse run-level converter form part of a decoder 31' used to reconstruct encoded pixels for storage in the previous frame memory 50. It should be noted that in general, the quantizer and inverse quantizer are usually formed as two separate hardware units. However, U.S. patent application Ser. No. 08/184,368 entitled Division Technique Unified Quantizer-Dequantizer, and filed for Chung-Yen Chiu on Jan. 19, 1994, discloses a single hardware unit which includes a quantizer and a dequantizer. The contents of this related application, which is assigned to the assignee hereof, is incorporated herein by reference.

Figure 1:
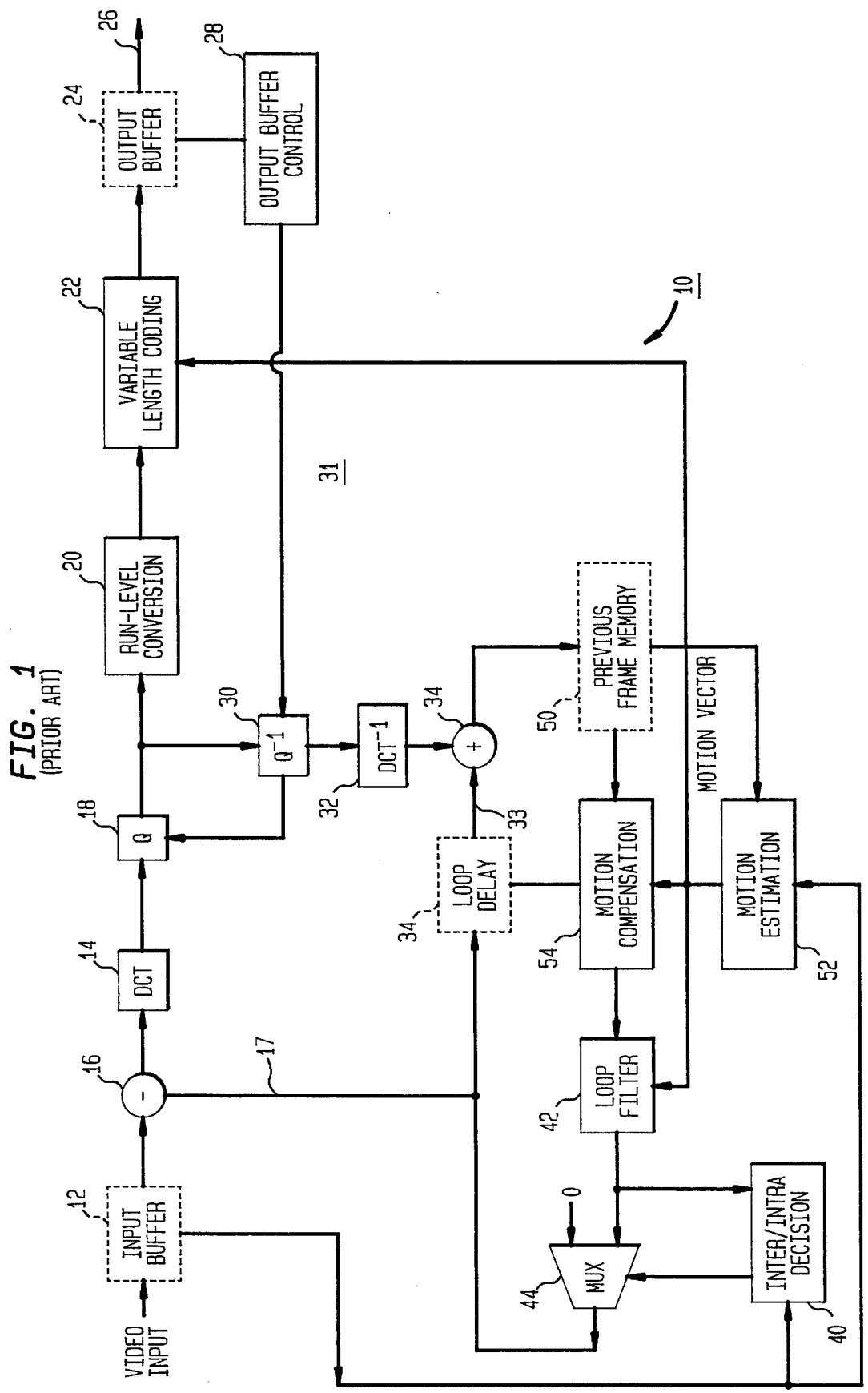
FIG. 1 schematically illustrates a conventional H.261 encoder.
Figure 2:
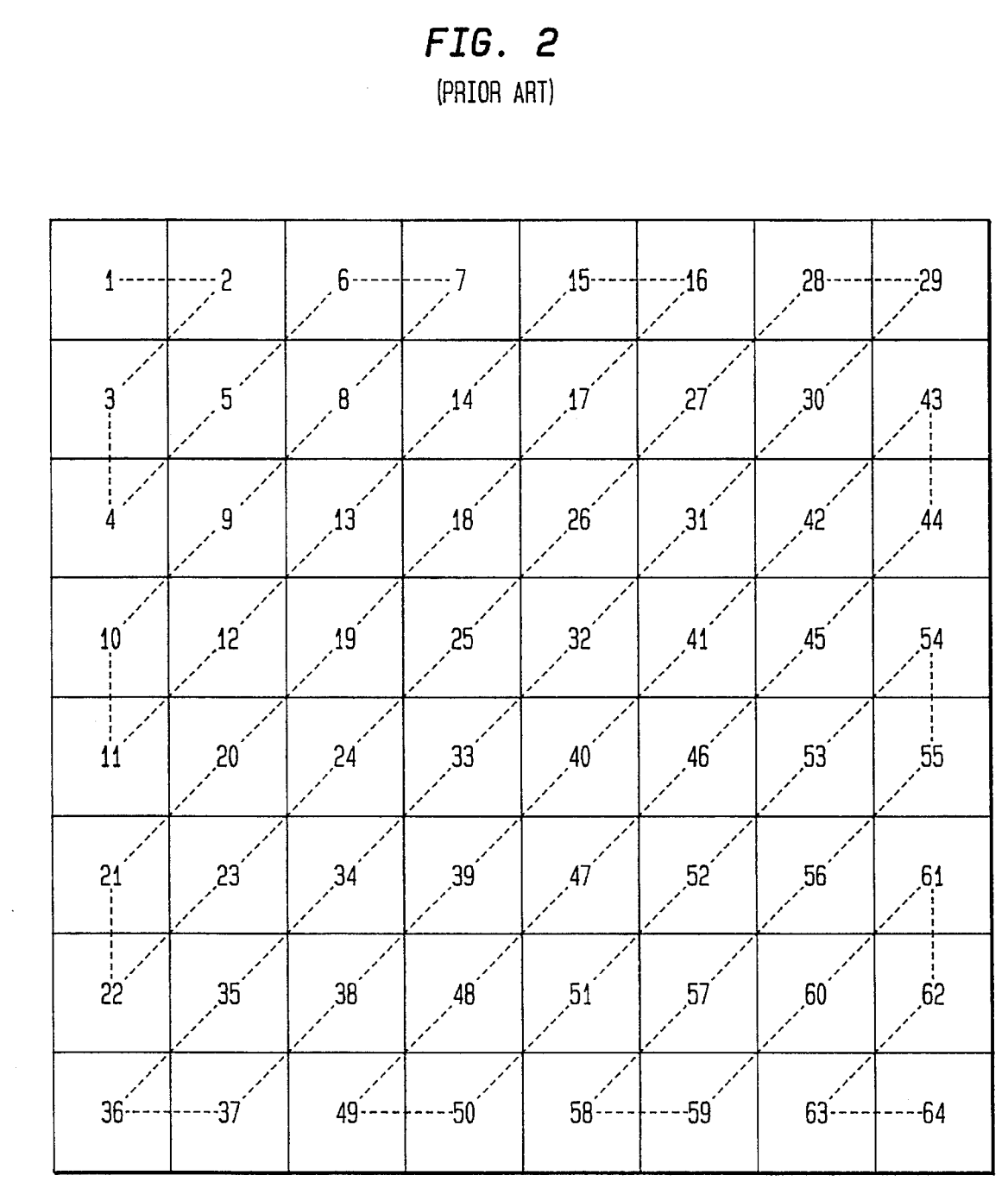

The encoder 10' of FIG. 3 operates in a manner similar to the encoder 10' of FIG. 1 in that DCT transform coefficients are generated for each block of video in a frame using the DCT circuit 14. The DCT circuit transforms the actual pixel values directly if intramode coding is used and the residues resulting from subtracting a prediction from the actual pixel values if intermode coding is used. The resulting transform coefficients are then zig-zag scanned using the scanning pattern of FIG. 2.

Figure 4:
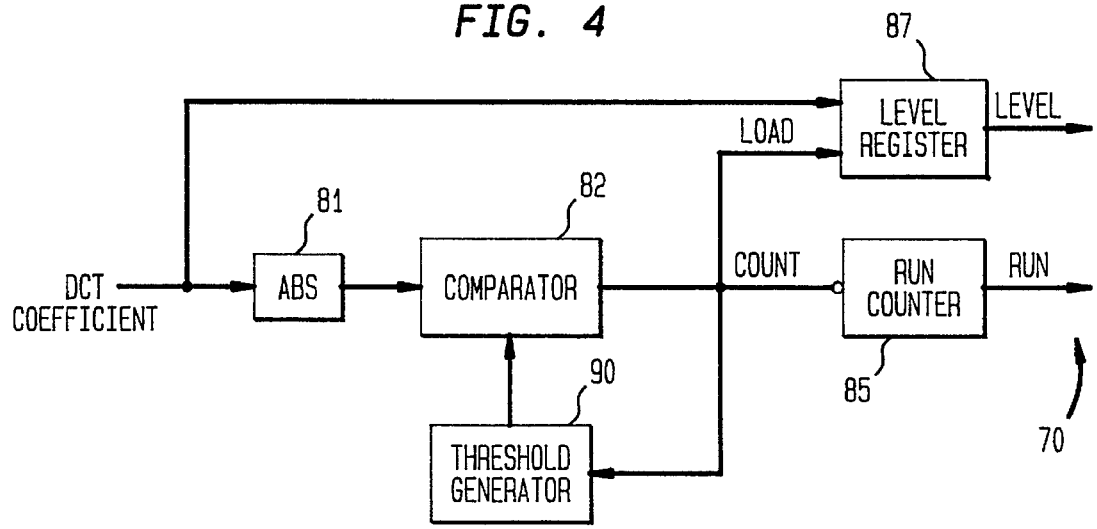
FIG. 4 illustrates a run-level converter for use in the encoder of FIG. 3.

The transform coefficients then undergo run-level conversion using the run-level converter 70. The run-level converter 70 is illustrated in greater detail in FIG. 4. As shown in FIG. 4, the absolute value of each DCT coefficient is obtained using the absolute value circuit 81. Then, using comparator 82, the absolute value of each transform coefficient is compared with a threshold value outputted by the threshold generator 90. If the absolute value of the DCT coefficient is less than the threshold value, the DCT coefficient is counted as a zero and the run counter 85 is incremented by one. If the absolute value of the DCT coefficient is greater than the threshold value, the corresponding DCT coefficient is loaded into the level register 87. Thus, the outputs of the run counter 85 and level register 87 form a run-level pair. The counter counts the run of zero's (i.e. run of DCT coefficients with absolute value below the threshold) and the level register 87 outputs the DCT coefficient whose absolute value is above the threshold. Each time there is a DCT coefficient whose absolute value is above the threshold, the counter 85 is reset.

By controlling the threshold value output by the threshold generator 90, it is possible to control the number of run-level pairs that are generated for each block of a video image. This in turn controls the number of bits transferred into the output buffer 26.

If the threshold value is increased, the number of run-level pairs will decrease because fewer DCT coefficients will have absolute values exceeding the threshold. If the threshold value is decreased, the number of run-level pairs will correspondingly increase because more DCT coefficients will have absolute values exceeding the threshold.

In accordance with the present invention, the threshold value generated by the threshold generator 90 is dynamically varied. The threshold generator 90 is shown in greater detail in 5. The threshold generator 90 comprises a reference count generator 92, a pair counter 94, a subtractor 96, and the threshold logic 98. The threshold logic 98 is controlled by the difference between a reference count outputted by the reference count generator 92 and an accumulated count of run-level pairs outputted for the image by the run-level pair converter, which count is accumulated by the pair counter 94. The reference count is generated as follows. Let B be the buffer size (i.e. the size of the output buffer 24) for the storage of run-level pair data and let N be the number of blocks of an image for which run-level pair data is to be stored. On average, each block can produce B/N=K run-level pairs or the buffer will overflow. However, to restrict the production of run-level pairs of each block to a maximum of K is not fair because those busy blocks which produce more run-level pairs than average are important for the final image quality.

Figure 6:
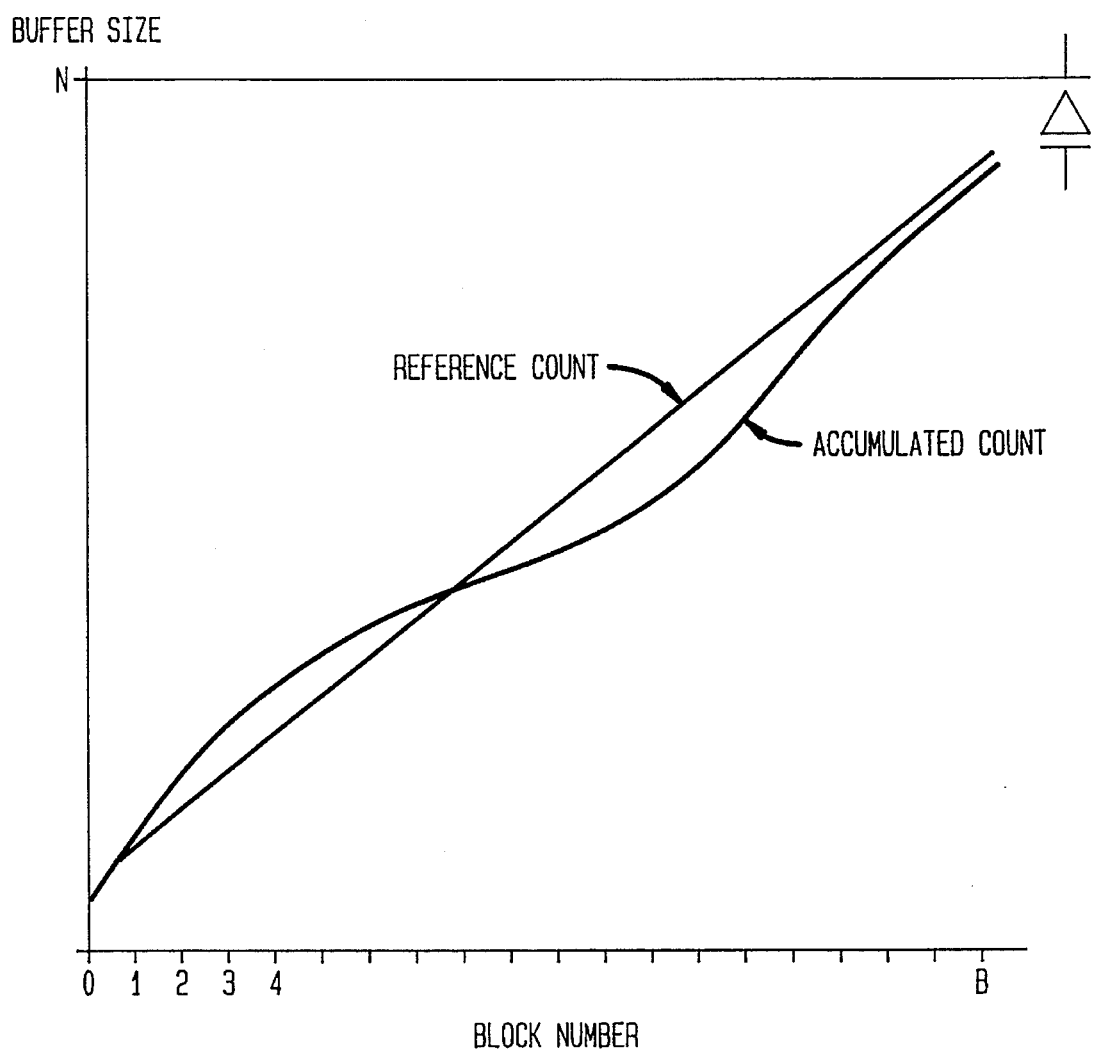
FIG. 6 is a curve which shows how the threshold generator of FIG. 5 controls the number of run-level pairs generated by the run-level converter of FIG. 5.

Instead an accumulation control mechanism is used to control the number of run-level pairs which are generated. The operation of this control mechanism can be understood in connection with FIG. 6. In FIG. 6, the horizontal axis is the block number, i.e. the blocks in an image are numbered consecutively, 1, 2, 3, . . . The vertical axis is a run-level pair count. The reference count generator is incremented by the fixed number K for each succeeding block. Thus, as a function of block number, the reference count is a straight line. The accumulated count is the accumulated total of run-level pairs actually produced by the run-level converter. This also increases with block number but is not a straight line. The difference between the reference count and the accumulated count is used to control the threshold value. When the accumulated count is greater than the threshold count, the threshold value will rise to reduce the production of run-level pairs. On the other hand, when the accumulated count is less than the reference count, the threshold value is decreased to increase the production of run-level pairs. Thus, as shown in FIG. 6, the real accumulated count is controlled around the reference count, and the difference is used to adapt the threshold value using the threshold logic. To guarantee the output buffer 26 will not overflow, a tolerance Δ is reserved for the last block in the image.

Figure 5:
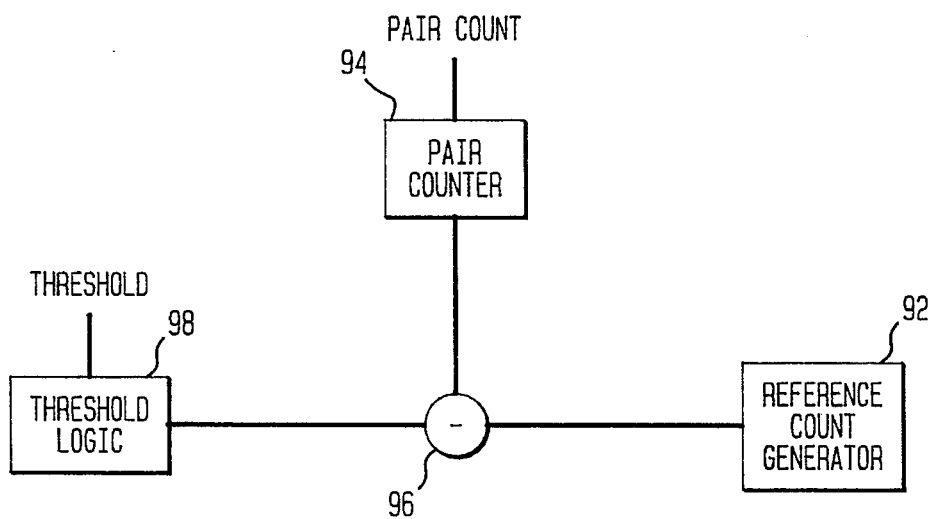
FIG. 5 illustrates a threshold generator for use in the run-level converter of FIG. 4.
Figure 7:
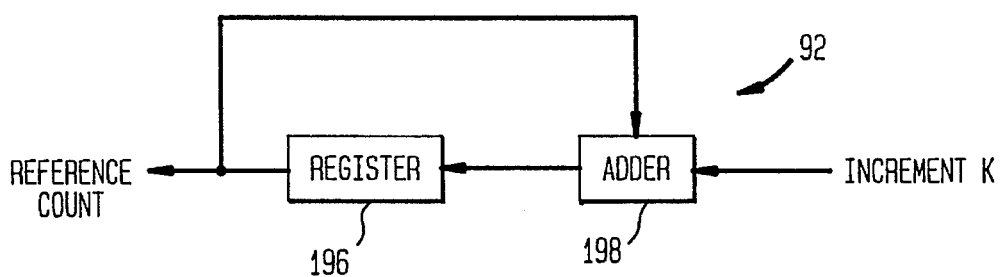
FIG. 7 illustrates a reference count generator for use in the threshold generator of FIG. 5.

As indicated above, the reference curve may be linear as a function of block number. A reference count generator 92 which generates a reference count which is linear as a function of block numbers is illustrated in FIG. 7. The reference count is stored in the register 196. For each block, the adder 198 adds the increment K to the previous reference count. It should be noted, however, that the reference curve need not be linear and that various non-linear curves may be used in particular circumstances. The threshold logic 98 (see FIG. 5) may be implemented as a simple comparator which compares the count difference to zero to increase or decrease an outputted threshold value. Or the threshold logic 98 may be implemented as a finite state machine.

Returning now to FIG. 3, after run-level conversion, the run-level pairs are quantized using quantization/inverse quantization circuit 72. The quantized run-level pairs are then variable length coded using coder 22 and stored in the output buffer 24. Note that the output buffer controller 28 can still control the quantization step size based on output buffer content. However, the look-backward algorithm which uses a feedback loop is not the only technique which can be used. It is also possible to use look-forward algorithm. As the data quantity of run-level pairs is much less than that of original coefficients, much less memory is needed for the look-forward algorithm. Therefore, the look-forward adaption for controlling the output buffer can be implemented easily; thus the coding quality can be improved.

As indicated above, the inverse quantizer part of circuit 72, the inverse run-level converter 74 and inverse DCT circuit 32 form a decoder 31' which is used to reconstruct encoded pixels for storage in the previous frame memory 50.

In the inventive encoder, quantization (and inverse quantization also) need not be done pixel-by-pixel, and only the level components of the run-level pairs need be quantized. This significantly reduces the computation requirements for quantization (and inverse quantization). Thus, quantization, inverse quantization, variable length coding and output buffer control can all be implemented in software using a microcomputer system or microprocessor.

Figure 8:
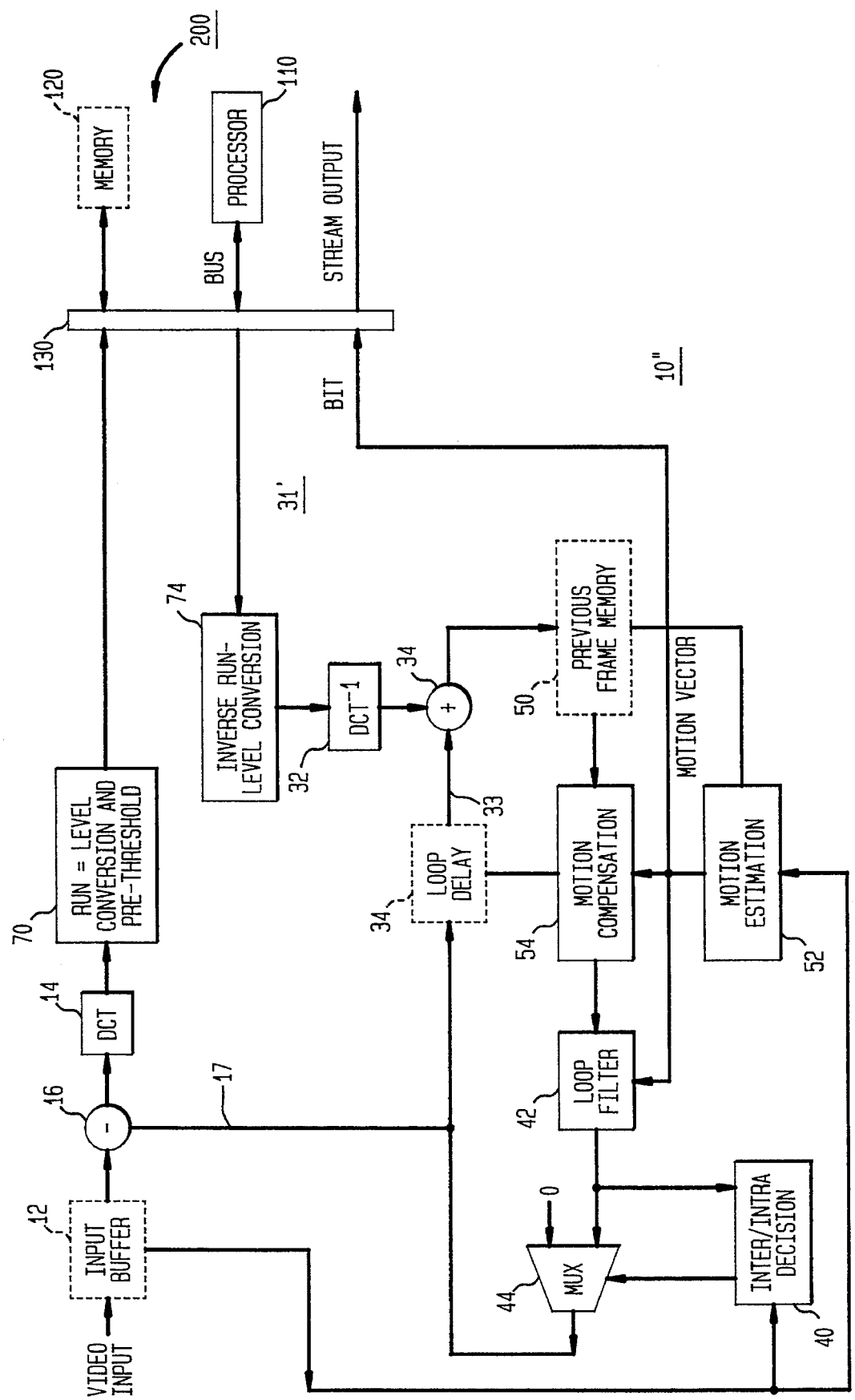
FIG. 8 is a video encoder in accordance with an alternative embodiment of the invention.

An encoder 10" which utilizes such a microprocessor is illustrated in FIG. 8. As compared to encoder 10' of FIG. 3, the quantization/inverse quantization circuit 72 is eliminated, the variable length coder 22 is eliminated, the output buffer 24 is eliminated and the output buffer controller 28 is eliminated. Instead, a microcomputer system 200 including the CPU (i.e. microprocessor) 110, memory 120, and local bus 130 is utilized. The run-level pairs from the converter circuit 70 are transported to the microprocessor 110 via the bus 130. The CPU 110 quantizes and variable length codes the run-level pairs. The CPU 110 also variable length codes motion vectors received from the motion estimation circuit 52 and generates the output bit stream. The CPU 110 also inverse quantizes the quantized run-level pairs and transmits the inverse quantized run-level pairs to the inverse run-level converter 74. The CPU 110 can, of course, utilize any one of the conventionally available look forward or look backward algorithms to control the quantization step size.

Finally, the above described embodiments of the invention are intended to be illustrative only. Numerous alternative embodiments may be devised by those skilled in the art without departing from the spirit and scope of the following claims.

I claim:

1. An encoder for a video image comprising means for generating a sequence of transform coefficients for each block of a video image to be coded, means for converting said transform coefficients into run-level pairs, and means for quantizing the run-level pairs.

2. The encoder of claim 1 wherein said transform coefficients are Discrete Cosine Transform coefficients.

3. The encoder of claim 1 wherein the means for converting the transform coefficients into run-level pairs comprises:

means for obtaining the absolute value of each transform coefficient, means for comparing the absolute value of each transform coefficient with a threshold value, counter means for counting a zero each time the absolute value of a transform coefficient is below said threshold value and for outputting a count indicating a run of consecutive zero's, and level register means for outputting the value of each transform coefficient whose absolute value is above the threshold.

4. The encoder of claim 3 wherein said threshold value is a dynamic value and said encoder includes a threshold generator for generating said dynamic threshold value comprising a pair counter for accumulating a number of run-level pairs outputted by said converting means for said image, a reference count generator for generating a reference count which is incremented by a reference count for each successive block of said image, means for obtaining a difference between said accumulated number of run-level pairs outputted by said converting means and said reference count, and means for increasing said threshold value when said accumulated number is greater than said reference count to decrease the numbers of run-level pairs produced by said converting means for a subsequent block of said image and for decreasing said threshold value when said accumulated number is less than said reference count to increase the number of run-level pairs produced by said converting means for a subsequent block of said image.

5. The encoder of claim 4 wherein said reference count is incremented by a fixed number for each successive block in said image to be encoded.

6. The encoder of claim 1 further including means for controlling the number of run-level pairs outputted by said converting means.

7. The encoder of claim 6 wherein said means for controlling the number of run-level pairs causes the number of generated run-level pairs to be increased if an accumulated number of run-level pairs previously generated for the image is less than a reference count and causes the number of run-level pairs generated to be decreased if the accumulated number of run-level pairs if is more than the reference count.

8. The encoder of claim 7 wherein the reference count is incremented by a fixed number for each block in said image.

9. The encoder of claim 1 further comprising means for variable length coding quantized run-level pairs outputted by said quantization means 10. The encoder of claim 9 further comprising an output buffer for storing variable length codewords outputted by said variable length coding means.

11. The encoder of claim 10 further comprising output buffer control means for controlling a step size of said quantizing means and inverse quantizing means in, response to a content of said output buffer contents.

12. The encoder of claim 9 further comprising means for inverse quantizing said quantized run-level pairs.

13. The encoder of claim 12 wherein said quantizing means, variable length coding means and inverse quantizing means are formed by a microprocessor.

14. The encoder of claim 12 further comprising means for performing inverse run-level conversion on inverse quantized run-level pairs outputted by said inverse quantizing means.

15. A method for coding a video image comprising the steps of generating a sequence of transform coefficients for each block of the video image, converting said transform coefficients into run-level pairs, and quantizing said run-level pairs.

16. The method of claim 15 wherein said converting step includes the step of controlling the number of run-level pairs by increasing the number of run-level pairs generated if an accumulated number of previously generated run-level pairs is less than a reference count and decreasing the number of run-level pairs generated if an accumulated number of previously generated run-level pairs is more than a reference count.

* * * * *